United States Patent
Bae et al.

(10) Patent No.: US 10,410,558 B2
(45) Date of Patent: Sep. 10, 2019

(54) MULTI-IMAGE DISPLAY DEVICE

(71) Applicant: Samsung Display Co., Ltd., Yongin-si, Gyeonggi-do (KR)

(72) Inventors: Jong-Sung Bae, Hwaseong-si (KR); Jae-Won Lee, Hwaseong-si (KR); Mu-Gyeom Kim, Hwaseong-si (KR); Yun-Mo Chung, Yongin-si (KR)

(73) Assignee: Samsung Display Co., Ltd. (KR)

( * ) Notice: Subject to any disclaimer, the term of this patent is extended or adjusted under 35 U.S.C. 154(b) by 188 days.

(21) Appl. No.: 15/148,903

(22) Filed: May 6, 2016

(65) Prior Publication Data

US 2017/0069240 A1     Mar. 9, 2017

(30) Foreign Application Priority Data

Sep. 7, 2015 (KR) .................. 10-2015-0126224

(51) Int. Cl.
*G09G 5/14* (2006.01)
*G09G 3/00* (2006.01)
(Continued)

(52) U.S. Cl.
CPC ............ *G09G 3/003* (2013.01); *H04N 13/00* (2013.01); *G06F 3/1423* (2013.01); *G09G 5/14* (2013.01);
(Continued)

(58) Field of Classification Search
CPC .... G09G 2300/023; G09G 3/003; G09G 5/14; G09G 2320/028; G09G 2340/12; G06F 3/012; G06F 3/013; G06F 3/014; G06F 3/015; G06F 3/1423; H04N 13/00; G02B 27/0093; G02B 27/01; G02B 2027/011; G02B 27/0112; G02B 2027/0118; G02B 2027/0134; G02B 2027/0147; G02B 27/0149; G02B 2027/0154; G02B 2027/0165; G02B 2027/0159; G02B 27/0179; G02B 2027/0181; G02B 2027/0183; G02B 2027/0185; G02B 2027/0196

See application file for complete search history.

(56) References Cited

U.S. PATENT DOCUMENTS 4,636,782 A * 1/1987 Nakamura ............. B60K 37/00
340/461
2001/0055082 A1* 12/2001 Kubo ................ G02F 1/133371
349/114

(Continued)

FOREIGN PATENT DOCUMENTS

KR   10-2002-0085356 A   11/2002

*Primary Examiner* — Lunyi Lao
*Assistant Examiner* — Jarurat Suteerawongsa
(74) *Attorney, Agent, or Firm* — Innovation Counsel LLP

(57) ABSTRACT

A multi-image display device according to example embodiments includes a first display panel configured to output a first image and a second display panel located on a second extension line inclined at a first angle with respect to a first extension line and configured to output a second image. The first extension line is an imaginary line extended from the first display panel along a horizontal direction of the first display panel. The second display panel reflects the first image to display a first superposition image in which the second image is superimposed on the first image.

19 Claims, 13 Drawing Sheets

(51) Int. Cl.
*H04N 13/00* (2018.01)
*G06F 3/14* (2006.01)

(52) U.S. Cl.
CPC . *G09G 2300/023* (2013.01); *G09G 2320/028* (2013.01); *G09G 2340/12* (2013.01)

(56) References Cited

U.S. PATENT DOCUMENTS

| | | | |
|---|---|---|---|
| 2005/0057439 A1* | 3/2005 | Hata | A42B 1/245 |
| | | | 345/8 |
| 2007/0195064 A1* | 8/2007 | Morioka | G03G 15/5016 |
| | | | 345/173 |
| 2010/0182219 A1* | 7/2010 | Tomisawa | G02B 27/2292 |
| | | | 345/4 |
| 2013/0215041 A1* | 8/2013 | Kim | G06F 3/0487 |
| | | | 345/173 |

* cited by examiner

MULTI-IMAGE DISPLAY DEVICE

CROSS REFERENCE TO RELATED APPLICATION

This application claims priority from and the benefit of Korean Patent Application No. 10-2015-0126224, filed on Sep. 7, 2015 in the Korean Intellectual Property Office (KIPO), the disclosure of which is hereby incorporated by reference herein in its entirety.

BACKGROUND

1. Field

Example embodiments of the inventive concept relate to display devices. More particularly, example embodiments of the inventive concept relate to multi-image display devices displaying a plurality of overlapped images.

2. Discussion of Related Art

A flat panel display (FPD) device is widely used as a display device of an electronic device because the FPD device is lightweight and thin as compared to a cathode-ray tube (CRT) display device. Typical examples of the FPD device are a liquid crystal display (LCD) device and an organic light emitting display (OLED) device.

Recently, a mirror OLED device has been developed that is capable of reflecting an image of an object (or target) that is located in front of the OLED device by including a reflective region and a pixel. Furthermore, a transparent OLED device that is capable of transmitting an image of an object (or target) located in the rear (or at the back) of the OLED device by including a transparent region and a pixel region has been developed.

SUMMARY

Example embodiments provide a multi-image display device implementing a stereoscopic visual effect using a mirror display panel and/or a transparent display panel.

According to example embodiments, a multi-image display device may comprise a first display panel configured to output a first image, and a second display panel located on a second extension line inclined at a first angle with respect to a first extension line which is an imaginary line extended from the first display panel along a horizontal direction of the first display panel and configured to output a second image. The second display panel reflects the first image to display a first superposition image in which the second image is superimposed on the first image.

In example embodiments, a depth of the reflected first image may be deeper than a depth of the second image by a reflection of the second display panel such that the first superposition image is represented as a stereoscopic image.

In example embodiments, the second display panel may reflect the first image to be a background image with respect to the second image.

In example embodiments, the first display panel may correspond to a flat display panel and the second display panel may correspond to a mirror display panel.

In example embodiments, the first display panel and the second display panel may be formed in an integral form.

In example embodiments, the second display panel may include a first substrate including a pixel region and a reflective region surrounding the pixel region, a light emitting structure in the pixel region, the light emitting structure being on the first substrate, a second substrate facing the first substrate, and a reflective member on a lower surface of the second substrate corresponding to the reflective region.

In example embodiments, the light emitting structure may include a transistor on the first substrate, a first electrode on the transistor, the first electrode being connected to the transistor, a pixel defining layer exposing at least a portion of the first electrode, a light emitting layer on the exposed first electrode, and a second electrode on the light emitting layer.

In example embodiments, the second display panel may include a substrate including a pixel region, a reflective region, and a peripheral region, a light emitting structure on the pixel region of the substrate, at least one blocking structure on the peripheral region of the substrate, a first inorganic layer to cover the light emitting structure and the at least one blocking structure, a first organic layer on the pixel region and the reflective region of the first inorganic layer, a second inorganic layer on the first inorganic layer and the first organic layer, a reflective member on the reflective region of the second inorganic layer, a second organic layer on the second inorganic layer to cover the reflective member, and a third inorganic layer on the second inorganic layer and the second organic layer.

In example embodiments, the multi-image display device may further comprise a joint unit mechanically connected between the first display panel and the second display panel to adjust the first angle.

In example embodiments, the multi-image display device may further comprise a third display panel located on a third extension line inclined at a second angle with respect to the first extension line and configured to output a third image. The third display panel may transmit the first superposition image to display a second superposition image in which the third image is superimposed on the first superposition image.

In example embodiments, a depth of the transmitted first superposition image may be deeper than a depth of the third image by a transmission of the first superposition image such that the second superposition image is represented as a stereoscopic image.

In example embodiments, the first display panel may correspond to a flat display panel, the second display panel may correspond to a mirror display panel, and the third display panel may correspond to a transparent display panel.

In example embodiments, the third display panel mat include a substrate including a pixel region and a transparent region adjacent to the pixel region, and a light emitting structure on the pixel region of the substrate, the light emitting structure including a plurality of insulation layers. The light emitting structure may be not located in the transparent region.

According to example embodiments, a multi-image display device may comprise a first display panel configured to output a first image, and a second display panel located on a second extension line inclined at a first angle with respect to a first extension line which is an imaginary line extended from the first display panel along a horizontal direction of the first display panel and configured to output a second image. The second display panel may transmit the first image to display a superposition image in which the second image is superimposed on the first image.

In example embodiments, a depth of the transmitted first image may be deeper than a depth of the second image by a transmission of the second display panel such that the superposition image is represented as a stereoscopic image.

In example embodiments, the second display panel may transmit the first image to be a background image with respect to the second image.

In example embodiments, the first display panel may correspond to a flat display panel and the second display panel may correspond to a transparent display panel.

In example embodiments, the second display panel may include a substrate including a pixel region and a transparent region adjacent to the pixel region and a light emitting structure on the pixel region of the substrate, the light emitting structure including a plurality of insulation layers. The light emitting structure may be not located in the transparent region.

In example embodiments, the first display panel and the second display panel may be formed in an integral form.

In example embodiments, the multi-image display device may further comprise a joint unit mechanically connected between the first display panel and the second display panel to adjust the first angle.

Therefore, the multi-image display device according to example embodiments may include the mirror display panel and/or the transparent display panel inclined to the other display panel so as to overlap (superimpose) images each output from a plurality of display panels. Thus, the user may perceive the superposition image as the stereoscopic image due to the depth difference among the images. Therefore, the multi-image display device may provide stereoscopic visual effects to the users using the mirror display panel. For example, the multi-image display device may be applied to automotive clusters for displaying stereoscopic images including a variety of information.

BRIEF DESCRIPTION OF THE DRAWINGS

Example embodiments can be understood in more detail from the following description taken in conjunction with the accompanying drawings, which includes the following.

DETAILED DESCRIPTION OF EMBODIMENTS

Exemplary embodiments are described more fully hereinafter with reference to the accompanying drawings in which various embodiments are shown.

Figure 1:
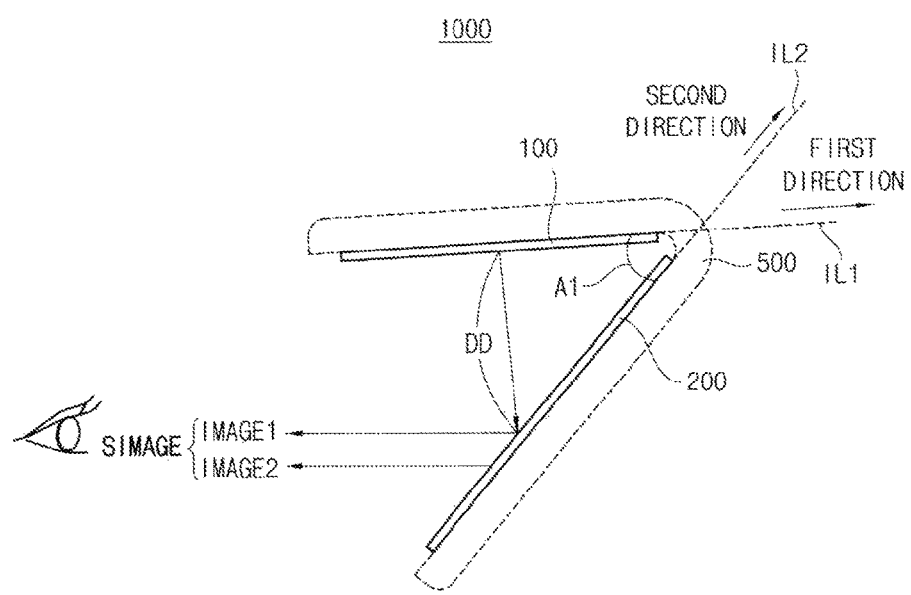
FIG. 1 is a diagram of a multi-image display device according to example embodiments.

FIG. 1 is a diagram of a multi-image display device according to example embodiments.

Referring to FIG. 1, the multi-image display device 1000 may include a first display panel 100 and a second display panel 200. The multi-image display device 1000 may further include a joint member 500 mechanically connected between the first display panel 100 and the second display panel 200.

The first display panel 100 may output a first image IMAGE1. The first display panel may correspond to a flat display panel including a plurality of pixels. For example, the first display panel 100 may be a liquid crystal display panel including a liquid crystal layer or an organic light emitting display panel including a plurality of organic light emitting diodes. However, these are examples; the first display panel 100 is not limited thereto.

The second display panel 200 may output a second image IMAGE2. The second display panel 200 may be located on a second extension line IL2 inclined at a first angle A1 with respect to a first extension line IL1 which is an imaginary line extended from the first display panel 100 along a horizontal direction of the first display panel 100 (e.g., direction of arrow FIRST DIRECTION). The second display panel 200 may reflect the first image IMAGE1 to display a superposition image SIMAGE. That is, the second image IMAGE2 is superimposed on the first image IMAGE1. The first angle A1 may be an acute angle less than 90°. Thus, the second display panel 200 may reflect the entire first image IMAGE1. For example, the first angle A1 may correspond to an angle in which the first image IMAGE1 is not seen directly to a user although the entire first image IMAGE1 is reflected to the second display panel 200. Accordingly, the user may watch the first image IMAGE1 and the second image IMAGE2 through only the second display panel 200.

In some embodiments, one side of the second display panel 200 and one side of the first display panel 100 may be in contact. In some embodiments, as illustrated in FIG. 1, the second display panel 200 may be separated from the first display panel 100. In some embodiments, the multi-image display device 1000 may be folded so that a light emitting surface of the first display panel 100 may be facing a light emitting surface of the second display panel 100.

In some embodiments, the superposition image SIMAGE may be represented as a stereoscopic image. Thus, the user may see the superposition image SIMAGE as the stereoscopic image. For example, a depth of the first image IMAGE1 may be deeper than a depth of the second image IMAGE2 (e.g., indicated as DD in FIG. 1) by a reflection of the second display panel 200 such that the user may see the superposition image SIMAGE as the stereoscopic image. The user may perceive that the second image IMAGE2 is closer to the user's eyes than the first image IMAGE1. In some embodiments, the second display panel 200 may reflect the first image IMAGE1 as a background image with respect to the second image IMAGE2. For example, the second image IMAGE2 output from the second display panel 200 may correspond to an object image, and the first image IMAGE1 output from the first display panel 100 may correspond to the background image for the object image.

The second display panel 200 may reflect the first image IMAGE1 such that the first image IMAGE1 appears to be behind the second image IMAGE2.

In some embodiments, the second display panel 200 may be a mirror display panel. The second display panel 200 may output the second image IMAGE2 and reflect the first image IMAGE1 output from the first display panel 100. For example, the second display panel 200 may include a plurality of pixels, and each of the pixels may include a pixel region and a reflective region surrounding the pixel region. Lights for displaying the second image IMAGE2 may be emitted from the pixel region. The reflective region may correspond to a mirror. A light emitting structure may be disposed in the pixel region, and a reflective member may be disposed in the reflective region.

In some embodiment, the multi-image display device 1000 may further include a support member and/or the joint member 500 to support and connect the first display panel 100 and the second display panel 200. For example, the joint member 500 may include a first body for supporting the first display panel 100 and protecting the first display panel 100 from external impacts and a second body for supporting the second display panel 200 and protecting the second display panel 200 from the external impacts. In some embodiments, the joint member 500 may correspond to a connecting portion between the first body and the second body. The joint member 500 may adjust the first angle A1. For example, the joint member 500 may be mechanically connected between the first display panel 100 and the second display panel 200 to adjust the first angle A1. Thus, the first angle A1 may be optimized to be seen efficiently.

In some embodiments, the first display panel 100 and the second display panel 200 may be formed in an integral form. For example, the multi-image display device 1000 may have a flexible or bent substrate (or display panel) including first and second area. The first area may include pixel regions for outputting the first image IMAGE1. The second area may include pixel regions for outputting the second image IMAGE2 and reflective regions for reflecting the first image IMAGE1.

As described above, the multi-image display device 1000 may include the second display panel 200 as the mirror display panel such that first and second images IMAGE1 and IMAGE2 are superimposed. Thus, the user may perceive the superposition image SIMAGE as the stereoscopic image due to the depth difference DD between the first image IMAGE1 and the second image IMAGE2. Therefore, the multi-image display device 1000 may provide stereoscopic visual effects to the users using the mirror display panel 200. For example, the multi-image display device may be applied to automotive clusters for displaying stereoscopic images including a variety of information.

Figure 2A:
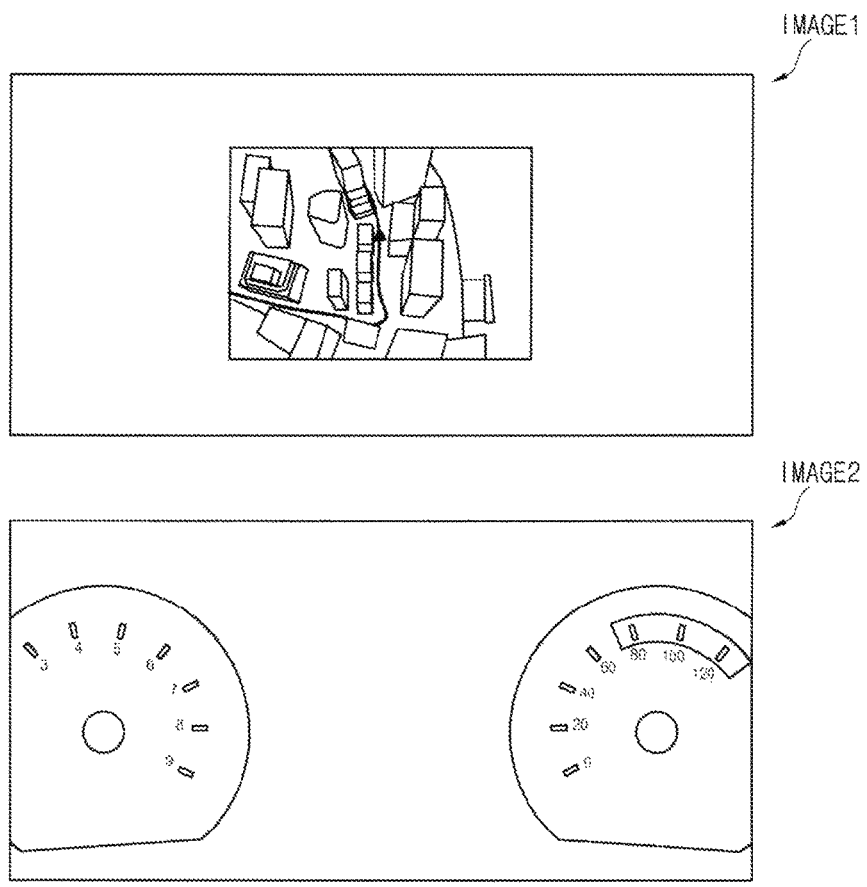
FIG. 2A is a diagram illustrating an example of output images displayed on first and second display panels included in the multi-image display device of FIG. 1.
Figure 2B:
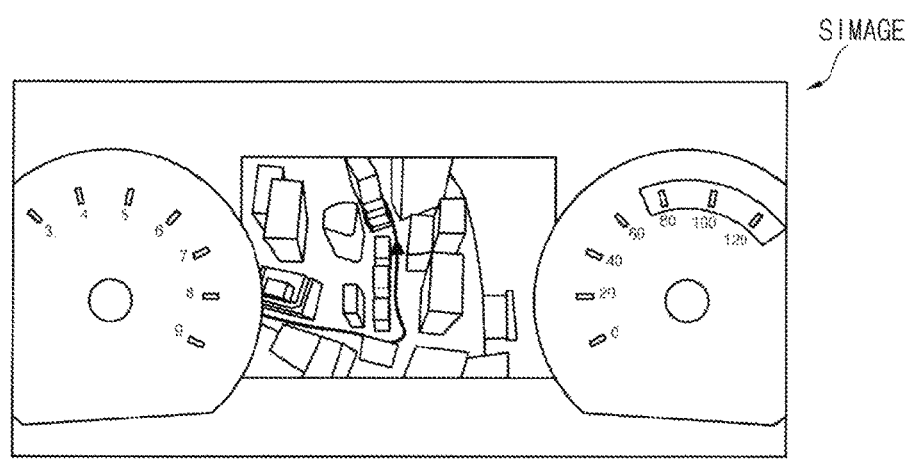
FIG. 2B is a diagram illustrating an image of the multi-image display device of FIG. 1 shown to a user.

FIG. 2A is a diagram illustrating an example of output images displayed on first and second display panels included in the multi-image display device of FIG. 1. FIG. 2B is a diagram illustrating an image of the multi-image display device of FIG. 1 shown to a user.

Referring to FIGS. 1 to 2B, the multi-image display device 1000 may display a superposition image SIMAGE including a first image IMAGE1 and a second image IMAGE2.

In some embodiments, as illustrated in FIG. 2, the first display panel 100 may output the first image IMAGE1 and the second display panel 200 may output the second image IMAGE2. Here, the first display panel 100 may be a flat display panel, and the second display panel 200 may be a mirror display panel. The first image IMAGE1 may be reflected to the second display panel 200 such that the user may see the first image only through the second display panel 200. The second image IMAGE2 may be output from the second display panel 200 such that the user may see the second image IMAGE2 with the first image IMAGE1. Thus, the multi-image display device 1000 may display the superposition image SIMAGE as a stereoscopic image. For example, as illustrated in FIG. 2B, the user may perceive the superposition image SIMAGE as the stereoscopic image through the second display panel 200. The user may perceive that the second image IMAGE2 is closer to the user's eyes than the first image IMAGE1.

Figure 3:
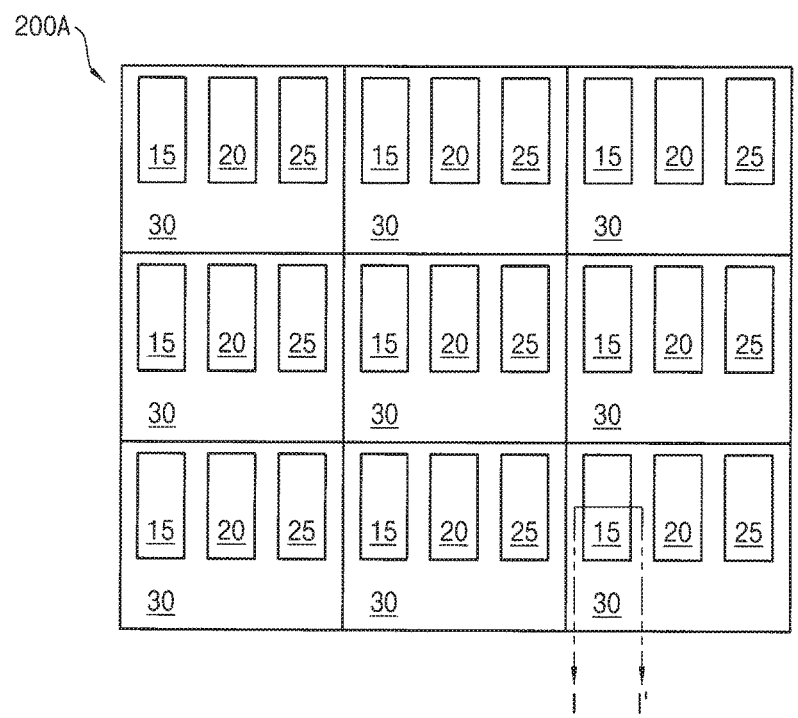
FIG. 3 is a plan view illustrating an example of a second display panel in the multi-image display device of FIG. 1.

FIG. 3 is a plan view illustrating an example of a second display panel in the multi-image display device of FIG. 1.

Referring to FIG. 3, the second display panel 200A may include a plurality of pixels. The second display panel 200A may include a pixel region 10 and a reflective region 30 surrounding the pixel region 10.

The pixel region may include first to third sub-pixels 15, 20, and 25. In some embodiments, the first to third sub-pixels 15, 20, and 25 may emit a red color light, a green color light, and a blue color light, respectively. The second image may be output from the pixel region 10.

The reflective region 30 may substantially surround the first to third sub-pixels 15, 20, 25. The reflective region 30 may reflect external light to act as a mirror function. The reflective region 30 may include a reflective member to reflect the external light. The reflective region 30 may reflect the first image that is output from the first display panel. Thus, a superposition image of the first and second images may be seen to the user.

Figure 4:
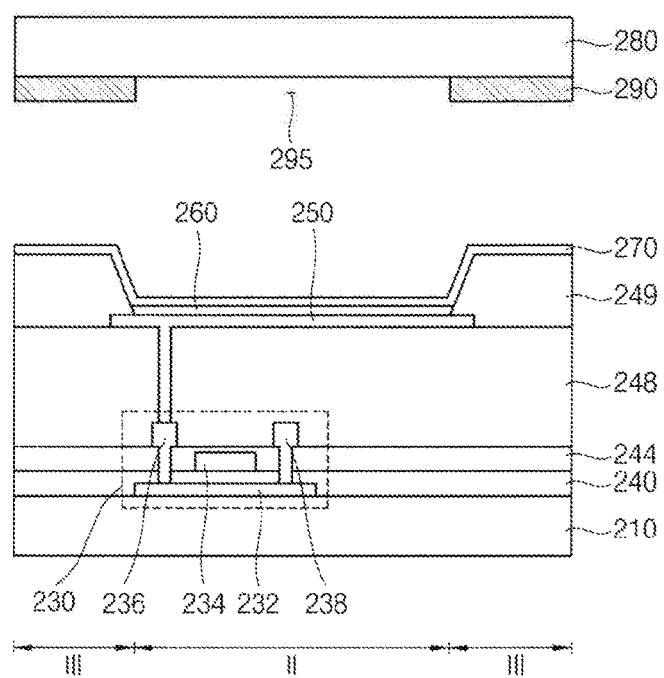
FIG. 4 is a cross-sectional view of the second display panel taken along the line I-I' of FIG. 3.

FIG. 4 is a cross-sectional view of the second display panel taken along the line I-I' of FIG. 3.

Referring to FIG. 4, the second display panel 200A may include a first substrate 210, a light emitting structure (including 249, 250, 260, and 270), a second substrate 280, and a reflective member 290 on a lower surface of the second substrate 280.

The second display panel 200A may include a pixel region II and a reflective region III. At least a part of the light emitting structure may be located in the pixel region II. The reflective member 290 may be located in the reflective region III. That is, an opening 295 corresponding to the pixel region II may be formed by the arrangement of the reflective member 290. The light emitting structure may emit light through the opening 295. In some embodiments, the light emitting structure may include a transistor 230, a first electrode 250, a light emitting layer 260, and a second electrode 270.

The first substrate 210 may include the pixel region II and the reflective region III surrounding the pixel region II. The first substrate 210 may include transparent materials. For example, the substrate 210 may include quartz, synthetic quartz, calcium fluoride, fluoride-doping quartz, a sodalime glass, a non-alkali glass, etc.

A buffer layer (not shown in FIG. 4) may be disposed on the substrate 210. The buffer layer may prevent the diffusion (e.g., an out gassing) of metal atoms and/or impurities from the first substrate 210. Additionally, the buffer layer may control a rate of heat transfer in a crystallization process for forming an active pattern 232, thereby obtaining a substantially uniform active pattern 232. Furthermore, the buffer layer may improve a surface flatness of the first substrate 210 when a surface of the first substrate 210 is relatively irregular. In some embodiments, depending on the type of the substrate 210, at least two buffer layers may be provided on the first substrate 210, or the buffer layer may be omitted.

The transistor 230 may include the active pattern 232, a gate electrode 234, a source electrode 238, and a drain electrode 236.

The active pattern 232 may be disposed on the first substrate 210. The active pattern 232 may include an oxide semiconductor, an inorganic semiconductor (e.g., amorphous silicon, polysilicon, etc.), an organic semiconductor, etc.

A gate insulation layer 240 may be disposed on the first substrate 210. The gate insulation layer 240 may cover the active pattern 232 in the pixel region II. The gate insulation layer 240 may include a silicon compound such as silicon oxide, silicon nitride, etc. Alternatively, the gate insulation layer 240 may include a metal oxide.

The gate electrode 234 may be disposed on the gate insulation layer 240. The gate electrode 234 may include metal, alloy, metal nitride, conductive metal oxide, transparent conductive materials, etc. Wirings, such as gate lines, electrically coupled to (e.g., electrically connected to) the gate electrode 234 may be disposed on the gate insulation layer 240.

An insulating interlayer 244 may be disposed on the gate insulation layer 240 to cover the gate electrode 234. The insulation interlayer 244 may electrically insulate the gate electrode 234 from upper-lying wirings and/or electrodes. The insulating interlayer 244 may include a silicon compound, a transparent resin, etc. Examples of the silicon compound for the insulating interlayer 244 may include silicon oxide, silicon nitride, silicon oxynitride, etc.

The source electrode 238 and the drain electrode 236 may be disposed on the insulating interlayer 244. The source electrode 238 and the drain electrode 236 may include a metal, an alloy, a conductive metal oxide, a transparent conductive material, etc. The source electrode 238 and the drain electrode 236 may pass through the insulating interlayer 244 and contact the active pattern 232, respectively.

An insulation layer 248 may be disposed on the source electrode 238 and the drain electrode 236 to cover the transistor 230. The insulation layer may electrically insulate the transistor 230 from the first electrode 250 of the light emitting structure in the pixel region II. The insulation layer 248 may include an organic material. For example, the insulation layer 248 may include a polyimide-based resin, a photoresist, an acryl-based resin, a polyamide-based resin, etc. These may be used alone or in a combination thereof. The insulation layer 248 may have a single layer structure or a multilayer structure. In some example embodiments, the insulation layer 248 may include an inorganic material such as a silicon compound, a metal oxide, etc.

The first electrode 250 may be disposed on the insulation layer 248. The first electrode 250 may be electrically coupled to (e.g., electrically connected to) the drain electrode 236 of the transistor 230 through a contact formed in the insulation layer 248. The first electrode 250 may include a metal, an alloy, a metal nitride, a conductive metal oxide, a transparent conductive material, etc. For example, the first electrode 250 may include aluminum, an alloy containing aluminum, aluminum nitride, silver, an alloy containing silver, tungsten, tungsten nitride, copper, an alloy containing copper, nickel, chrome, chrome nitride, molybdenum, an alloy containing molybdenum, titanium, titanium nitride, platinum, tantalum, tantalum nitride, neodymium, scandium, strontium ruthenium oxide, zinc oxide, indium tin oxide, tin oxide, indium oxide, gallium oxide, indium zinc oxide, etc. These may be used alone or in a combination thereof.

A pixel defining layer 249 may be disposed on the insulation layer 248. The pixel defining layer 249 may include an opening that exposes the first electrode 250. The openings of the pixel defining layer 249 may define light emitting regions (i.e., the pixel regions II). The pixel defining layer 249 may include an organic material. For example, the pixel defining layer 249 may include a polyimide-based resin, a photoresist, a polyacryl-based resin, a polyamide-based resin, an acryl-based resin, etc. A spacer may be disposed on the pixel defining layer 249 so as to ensure a cell gap of the pixel.

The light emitting layer 260 may be disposed on the first electrode exposed by the opening in the pixel defining layer 249. The light emitting layer 260 may have a multilayer structure that includes an organic light emitting layer (EML), a hole injection layer (HIL), a hole transfer layer (HTL), an electron transfer layer (ETL), an electron injection layer (EIL), etc. The organic light emitting layer of the light emitting layer 260 may include light emitting materials emitting different colors of light, such as red, blue, and green, according to the respective kind of pixel. In some embodiments, the organic light emitting layer of each light emitting layer 260 may include a plurality of stacked light emitting materials for emitting red light, blue light, and green light so as to generate substantially white color light.

The second electrode 270 may be disposed on the light emitting layer 260 and the pixel defining layer 249. The second electrode 270 may serve as a common electrode shared by adjacent pixels. The second electrode 270 may include a metal, an alloy, a metal nitride, a conductive metal oxide, a transparent conductive material, etc.

The reflective member 290 may be disposed on the second electrode 270. The reflective member 290 may be substantially disposed at the lower surface of the second substrate 280. The reflective member 290 may be located corresponding to the reflective region III so as to include the opening 295. The opening 295 may substantially overlap with the pixel region II. However, it is not necessary that the opening 295 has the same size as the pixel region II.

A first surface (e.g., a lower surface) of the reflective member 290 may be facing the second electrode 270. A second surface (e.g., an upper surface or an opposite side of the first surface) of the reflective member 290 may be in contact with the second substrate 280. Incident light shone through the second substrate 280 from the outside may be reflected from the second side of the reflective member 290. For example, an image output from the first display panel 100 may be displayed on the second side of the reflective member 290. A light generated in the light emitting layer 260 may be passed through the opening 295 in the pixel region II. The reflective member 290 may include a material having a relatively high reflectivity. For example, the reflective member 290 may include gold (Au), silver (Ag), aluminum (Al), platinum (Pt), nickel (Ni), titanium (Ti), etc. Alternately, the reflective member 290 may include an alloy, metal nitride, conductive metal oxide, a transparent conductive material, etc. For example, the reflective member 290 may include an aluminum alloy, aluminum nitride (AlNx), a silver alloy, tungsten nitride (WNx), a copper alloy, chrome nitride (CrNx), a molybdenum alloy, titanium nitride (TiNx), tantalum nitride (TaNx), strontium ruthenium oxide (SRO), zinc oxide (ZnOx), indium tin oxide (ITO), stannum oxide (SnOx), indium oxide (InOx), gallium oxide (GaOx), indium zinc oxide (IZO), etc. These may be used alone or in a combination thereof.

Accordingly, the second display panel 200A may include the reflective region II having the reflective member 290 so as to display the superposition image including a reflected first image from the first display panel and the second image from the pixel region II. Thus, the user may see the superposition image displayed on the multi-image display device 1000 as a stereoscopic image.

The second substrate 280 may be disposed on the reflective member 290. The second substrate 280 may serve as an encapsulation substrate. The second substrate 280 and the first substrate 210 may include substantially the same materials. For example, the second substrate 280 may include quartz, synthetic quartz, calcium fluoride, fluoride-doping quartz, sodalime glass, non-alkali glass, etc. In some example embodiments, the second substrate 280 may include a transparent inorganic material or flexible plastic. For example, the second substrate 280 may include a flexible transparent resin substrate. The second substrate 280 may include a stacked structure in which at least one organic layer and at least one inorganic layer are alternately (or repeatedly) stacked.

Figure 5:
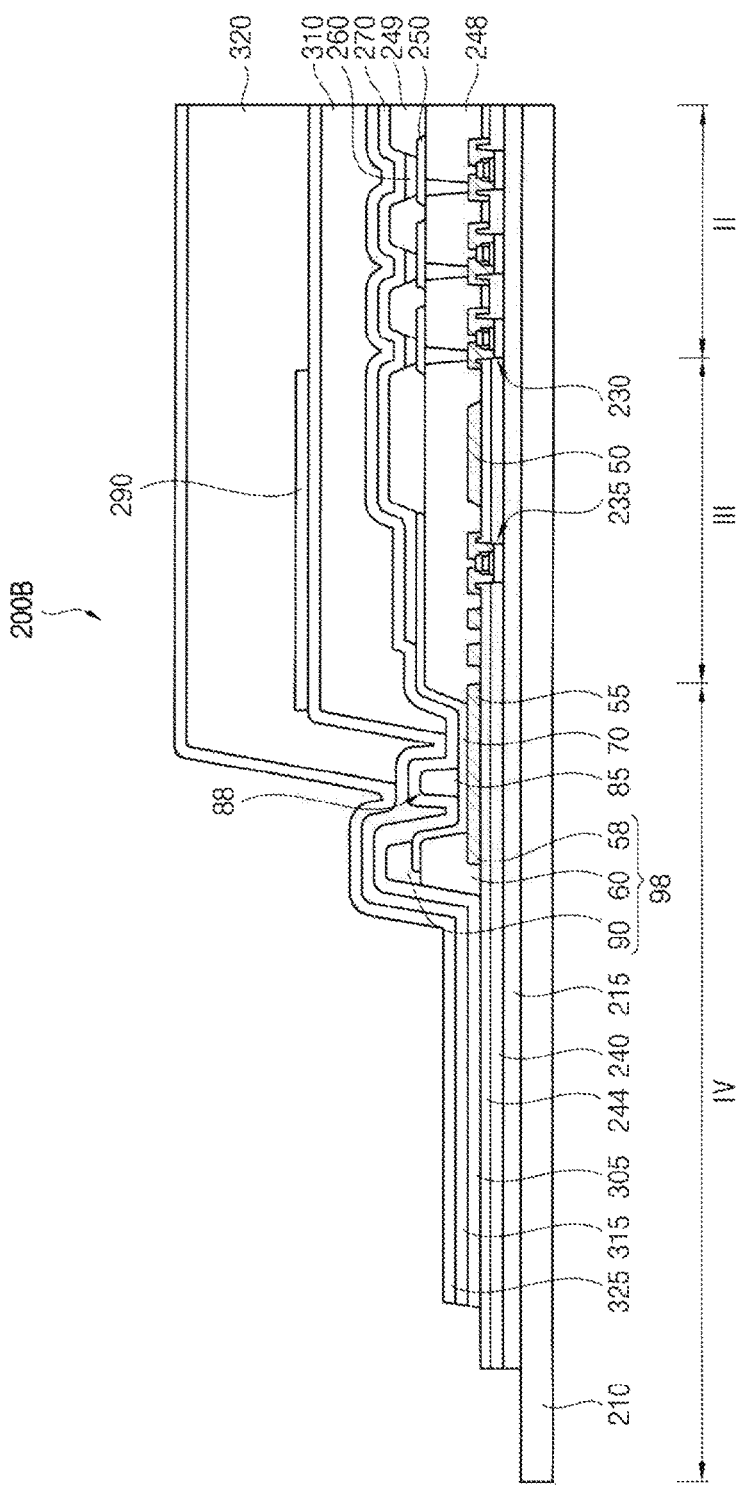
FIG. 5 is a cross-sectional view illustrating another example of a second display panel in the multi-image display device of FIG. 1.

FIG. 5 is a cross-sectional view illustrating another example of a second display panel in the multi-image display device of FIG. 1.

In FIG. 5, like reference numerals are used to designate elements of the second display panel that are the same as those in FIG. 4, and detailed description of these elements may be omitted. The second display panel of FIG. 5 may be substantially the same as or similar to the second display panel of FIG. 4 except for blocking structures and a second substrate.

Referring to FIG. 5, the second display panel 200B may correspond to a mirror display panel. In some embodiments, the second display panel 200B may be a flexible mirror display panel. Thus, as illustrated in FIG. 5, the second display panel 200B may include an encapsulation layer (or an encapsulation substrate) including a flexible transparent resin.

The second display panel 200B may include a substrate 210 including a pixel region II, a reflective region III, and a peripheral region IV, a light emitting structure on the pixel region II of the substrate 210, at least one blocking structure 88 and 98 on the peripheral region IV of the substrate 210, and inorganic layers on the light emitting structure, and at least one organic layer. For example, the organic layer may be disposed over the light emitting structure between the inorganic layers. In some embodiments, as illustrated in FIG. 5, the second display panel 200B may include a first inorganic layer 305, a first organic layer 310 on the first inorganic layer 305, a second inorganic layer 315 on the first organic layer 310, a reflective member 290 on the reflective region III of the second inorganic layer 315, a second organic layer 320 on the reflective member 290 and the second inorganic layer 315, and a third inorganic layer 325 on the second organic layer 320. However the stacked structure of the inorganic and organic layers described above is an example; the stacked structures of the inorganic and organic layers are not limited thereto.

A peripheral circuit and the blocking structures 88 and 98 may be located in the peripheral region IV. The peripheral region IV may comprise a peripheral circuit region where the peripheral circuit is located and a dead space region (e.g., a region that does not contribute to display of images) corresponding to an outermost region of the pixel. In some embodiments, first and second blocking structures 88 and 98 may be disposed in the peripheral circuit region.

A buffer layer 215 may be disposed on the substrate 210, and transistors 230 and 235 may be disposed on the buffer layer 215. First transistors 230 may correspond to switching transistors of the second display panel 200B, and second transistors 235 may correspond to driving transistors of the second display panel 200B.

Data lines 50 and 55 may be located on the insulating interlayer 244 and electrically connected to the transistors 230 and 235.

In the reflective region III and the peripheral region IV of the second display panel 200B, a protection member 70 may be disposed on the upper portion and a lateral portion (e.g., a side) of the insulation layer 248. The protection member 70 may protect the peripheral circuit from static electricity, external impact, etc. For example, the protection member 70 may contact the side of the pixel defining layer 249 and may extend onto the outermost wiring (or data line) 55 while substantially enclosing the side of the pixel defining layer 80. The protection member 70 may include material substantially the same as or similar to those of the first electrodes 250.

In some embodiments, the first blocking structure 88 having the first height may be disposed on the outermost wiring 55. The first blocking structure 88 may include the first metal layer pattern (e.g., the protection member 70) and a first insulation layer pattern 85. Because the first blocking structure 88 may have the first metal layer pattern and the first insulation layer pattern 85, the first blocking structure 88 may prevent the first organic layer 310 and/or the second organic layer 320 from leaking to an outside of the peripheral region IV (e.g., the first blocking structure 88 may prevent the first organic layer 310 and/or a second organic layer 320 from contacting the outermost wiring 55).

The second blocking structure 98 may be adjacent to the first blocking structure 88. The second blocking structure 98 may include a second metal layer pattern 58 (e.g., a part of the outmost wiring 55), a second insulation layer pattern 60, and a third insulation layer pattern 90. The second blocking structure 98 may further prevent the first organic layer 310 and/or the second organic layer 320 from leaking into the peripheral region IV. For example, when the second organic layer 320 flows over the first blocking structure 88, the second blocking structure 98 may prevent the leakage of the second organic layer 320 toward the peripheral region IV (e.g., the second blocking structure 98 may prevent further leakage of the second organic layer 320 into the peripheral region IV). Here, the first to third insulation layer patterns may include a polyimide-based resin, a photoresist, an acryl-based resin, a polyamide-based resin, etc. These may be used alone or in a combination thereof.

The first inorganic layer 305 may be disposed on the light emitting structures and the blocking members 88 and 98 to cover the light emitting structures and the blocking members 88 and 98. In some embodiments, the first inorganic layer 305 may be disposed over the pixel region II, the reflective region III, and the peripheral region IV to cover the light emitting structures and the blocking members 88 and 98. The first inorganic layer 305 may prevent the light emitting structures from being deteriorated by the permeation of moisture, oxygen, etc. Additionally, the first inorganic layer 305 may protect the light emitting structures from external impacts. The first inorganic layer 305 may include a metal compound. For example, the first inorganic layer 305 may include silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, etc.

The first organic layer 310 may be disposed on the pixel region II and the reflective region III of the first inorganic layer 305. Thus, parts of the first inorganic layer 305 may be exposed. The first organic layer 310 may improve the flatness of the second display panel 200B also may protect the light emitting structures. Further, the first organic layer 310 may prevent the diffusion of impurities from or to the underlying structures. For example, the first organic layer 310 may include a polyimide-based resin, a polyacryl-based resin, a polyamide-based resin, etc.

The second inorganic layer 315 may be disposed on the exposed the first inorganic layer 305 and the first organic layer 310. The second inorganic layer 315 may prevent the light emitting structures from being deteriorated by the permeation of moisture, oxygen, etc with the first inorganic layer 305. Additionally, the second inorganic layer 315 may protect the light emitting structures from external impacts. The second inorganic layer 315 may include material substantially the same as or similar to those of the first inorganic layer 305.

The reflective member 290 may be disposed on the reflective region III of the second inorganic layer 315. The first surface of the reflective member 290 may be facing the second electrode 270. A first surface (e.g., a lower surface) of the reflective member 290 may be facing the second inorganic layer 315. A second surface (e.g., an upper surface or an opposite side of the first surface) of the reflective member 290 may be covered with the second organic layer 320. Incident light shone from the outside may be reflected from the second side of the reflective member 290. For example, an image output from the first display panel 100 may be displayed on the second side of the reflective member 290. The reflective member 290 may include a material having a relatively high reflectivity.

The second organic layer 320 may be disposed on the pixel region II and the reflective region III of the second inorganic layer 315 to cover the reflective member 290. Parts of the second inorganic layer 315 may be exposed. The second organic layer 320 may perform functions substantially the same or similar to those of the first organic layer 310.

The third inorganic layer 325 may be disposed on the exposed second inorganic layer 315 and the second organic layer 320. The third inorganic layer 325 may perform functions substantially the same or similar to those of the first inorganic layer 305 and/or the second inorganic layer 315. The third inorganic layer 325 may include material substantially the same or similar to those of the first inorganic layer 305 and/or the second inorganic layer 315.

Accordingly, the second display panel 200B may include the reflective region III having the reflective member 290 so as to display the superposition image including a reflected first image from the first display panel and the second image from the pixel region II. Thus, the user may see the superposition image displayed on the multi-image display device 1000 as a stereoscopic image.

Figure 6:
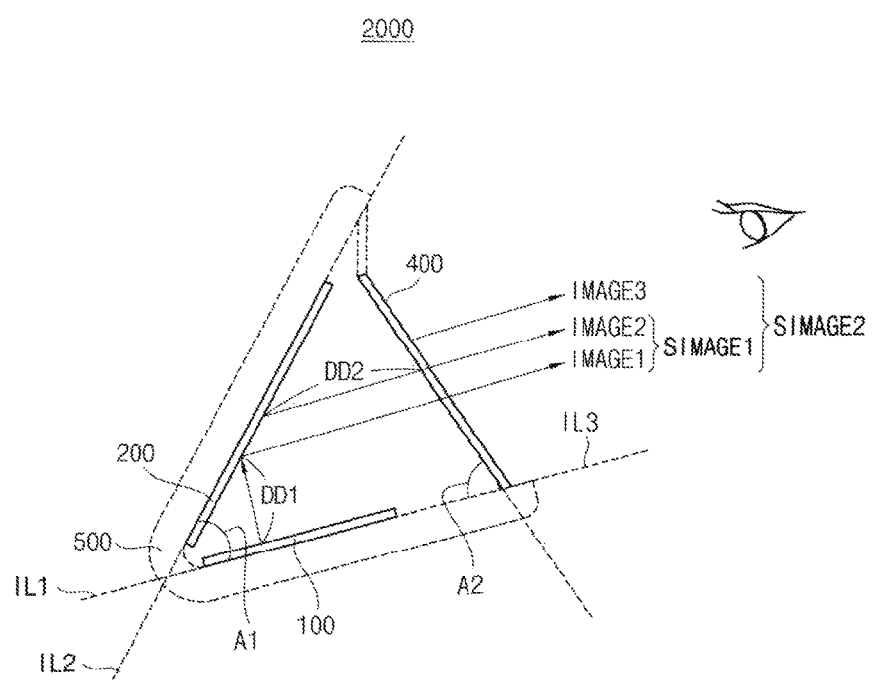
FIG. 6 is a diagram of a multi-image display device according to example embodiments.

FIG. 6 is a diagram of a multi-image display device according to example embodiments.

In FIG. 6, like reference numerals are used to designate elements of the multi-image display device that are the same as those in FIG. 1, and detailed description of these elements may be omitted. The multi-image display device of FIG. 6 may be substantially the same as or similar to the multi-image display device of FIG. 1 except for a third display panel 400.

Referring to FIG. 6, the multi-image display device 2000 may include a first display panel 100, a second display panel 200 located on a second extension line IL2 inclined at a first angle A1 with respect to a first extension line IL1 which is an imaginary line extended from the first display panel 100 along a horizontal direction of the first display panel 100, and a third display panel 400 located on a third extension line IL3 inclined at a second angle A2 with respect to the first extension line IL1. The multi-image display device 2000 may further include a joint member 500 mechanically connected between the first display panel 100 and the second display panel 200.

The first display panel 100 may output a first image IMAGE1. The first display panel may correspond to a flat display panel including a plurality of pixels.

The second display panel 200 may output a second image IMAGE2. The second display panel 200 may be located on the second extension line IL2 inclined at the first angle A1 with respect to the first extension line IL1. The second display panel 200 may reflect the first image IMAGE1 to display a first superposition image SIMAGE1 in which the second image IMAGE2 is superimposed on the first image IMAGE1. The first angle A1 may be an acute angle less than 90°. Thus, the second display panel 200 may reflect the entire first image IMAGE1. The second display panel 200 may reflect the first image IMAGE1 such that the first image IMAGE1 appears to be behind the second image IMAGE2. Since the second display panel is described above referred to FIGS. 1 to 5, duplicate descriptions are not repeated.

The third display panel 400 may output a third image IMAGE3. The third display panel 400 may be located on the third extension line IL3 inclined at the second angle A2 with respect to the first extension line IL. The third display panel 400 may transmit the first superposition image SIMAGE1 to the outside. The third display panel 400 may display a second superposition image SIMAGE2 in which the third image IMAGE3 is superimposed on the first superposition image SIMAGE1. In some embodiments, the first to third extension lines IL1 to IL3 may make a trigonal form. The first and second angles A1 and A2 may be internal angles of the trigonal form. The first and second angles A1 and A2 may be acute angles less than 90°. For example, the first image IMAGE1 is not seen directly to a user although the entire first image IMAGE1 is reflected to the second display panel 200, and the third image is not reflected to the second display panel 200 although the first superposition image SIMAGE1 is transmitted to the third display panel 400. The first to third display panels 100, 200, and 400 may be connected in a trigonal prism form by a support member or the joint member 500. In some embodiments, the first and second angles A1 and A2 may be adjusted by a command.

In some embodiments, the second superposition image SIMAGE2 may be represented as a stereoscopic image. Thus, the user may see the second superposition image SIMAGE2 as the stereoscopic image. For example, a depth of the first image IMAGE1 may be deeper than a depth of the second image IMAGE2 (e.g., indicated as DD1 in FIG. 6), and the depth of the second image IMAGE2 may be deeper than a depth of the third image IMAGE3 (e.g., indicated as DD2 in FIG. 6), such that the user may see the second superposition image SIMAGE2 as the stereoscopic image. The user may perceive that the third image IMAGE3 is closer to the user's eyes than the second image IMAGE2 and the second image IMAGE2 is closer to the user's eyes than the first image IMAGE1. In other words, the user may perceive that the first image IMAGE1 is behind the second image IMAGE2 and the second image IMAGE2 is behind the third image IMAGE3.

In some embodiments, the first display panel 100 may correspond to a flat display panel, the second display panel 200 may correspond to a mirror display panel, and the third display panel 400 may correspond to a transparent display panel. The second display panel 200 may output the second image IMAGE2 and reflect the first image IMAGE1 output from the first display panel 100. The third display panel 400 may output the third image IMAGE3 and transmit the first superposition image SIMAGE1 from the second display panel 200 to the outside. For example, the third display panel 400 may include a plurality of pixels. Each of the pixels of the third display panel 400 may include a pixel region and a transparent region. Light for displaying the third image IMAGE3 may be emitted from the pixel region. The first superposition image SIMAGE1 may be transmitted through the transparent region of the third display panel 400.

As described above, the multi-image display device 2000 may generate the second superposition image SIMAGE2 using the first to third display panels 100, 200, and 400. Thus, the user may perceive the second superposition image SIMAGE2 as the stereoscopic image due to the depth difference DD1 and DD2 of the first to third images IMAGE1, IMAGE2, and IMAGE3. Therefore, the multi-image display device 2000 may provide stereoscopic visual effects to the users using the mirror display panel 200 and the transparent display panel 400.

Figure 7A:
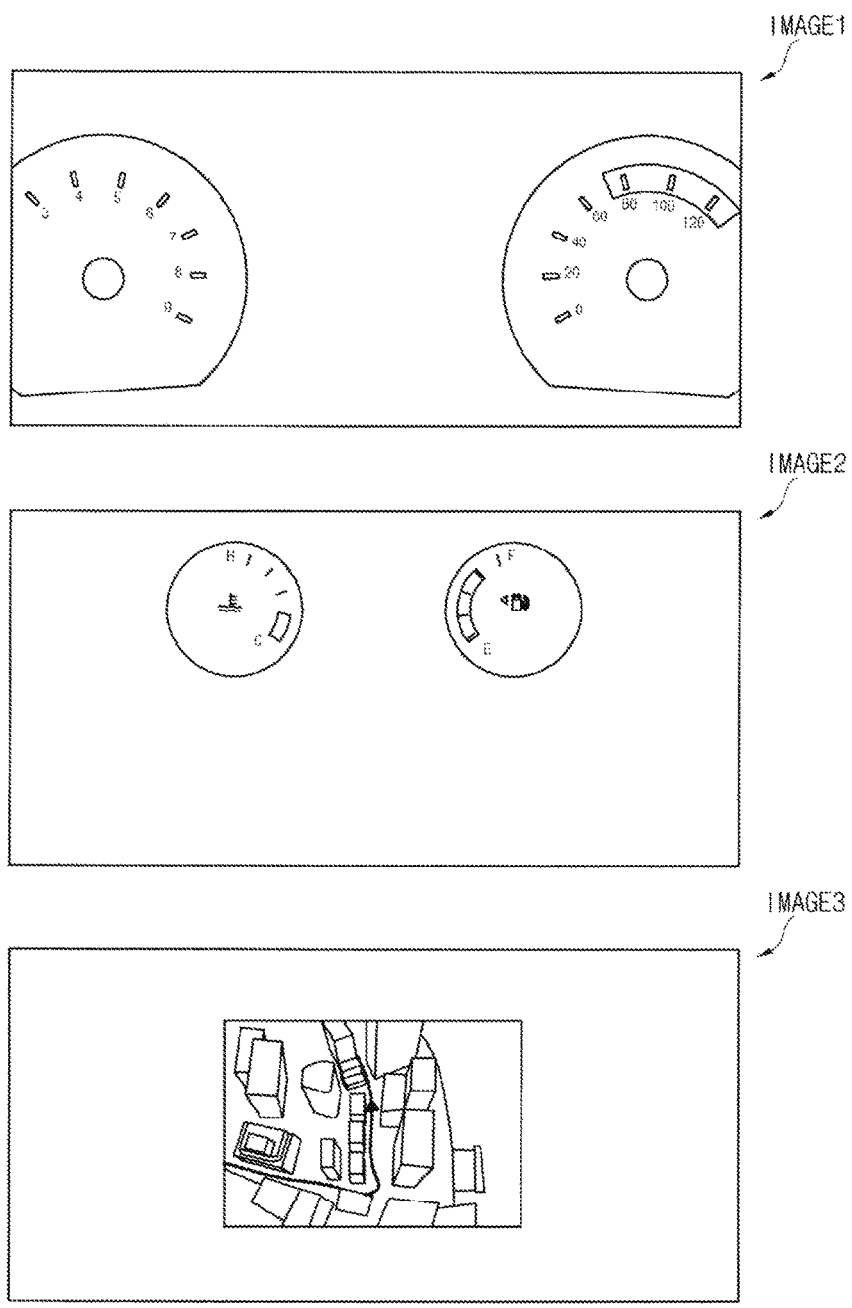
FIG. 7A is a diagram illustrating an example of output images displayed on first, second and third display panels included in the multi-image display device of FIG. 6.
Figure 7B:
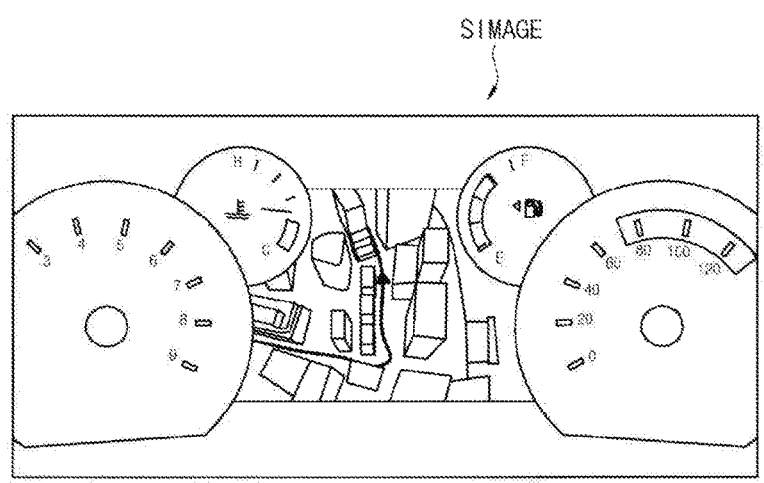
FIG. 7B is a diagram illustrating an image of the multi-image display device of FIG. 6 shown to a user.

FIG. 7A is a diagram illustrating an example of output images displayed on first, second and third display panels included in the multi-image display device of FIG. 6. FIG. 7B is a diagram illustrating an image of the multi-image display device of FIG. 6 shown to a user.

Referring to FIGS. 6 to 7B, the multi-image display device 2000 may display a superposition image SIMAGE including a first image IMAGE1, a second image IMAGE2 and a third image IMAGE3.

In some embodiments, as illustrated in FIG. 7A, the first display panel 100 may output the first image IMAGE1, the second display panel 200 may output the second image IMAGE2, and the third display panel may output the third image IMAGE3. Here, the first display panel 100 may be a flat display panel, the second display panel 200 may be a mirror display panel, and the third display panel 400 may be a transparent display panel. The first image IMAGE1 may be reflected to the second display panel 200 and transmitted through the third display panel 400 so as to be seen the user. The second image IMAGE2 may be output from the second display panel 200 and transmitted through the third display panel 400 so as to be seen the user. The third image IMAGE3 may be directly output from the third display panel 400. Thus, as illustrated in FIG. 7B, the multi-image display device 2000 may display the superposition image SIMAGE including the first image IMAGE1, the second image IMAGE2, and the third image IMAGE3 as a stereoscopic image. For example, as illustrated in FIG. 7B, the user may perceive the superposition image SIMAGE as the stereoscopic image through the third display panel 400.

Figure 8:
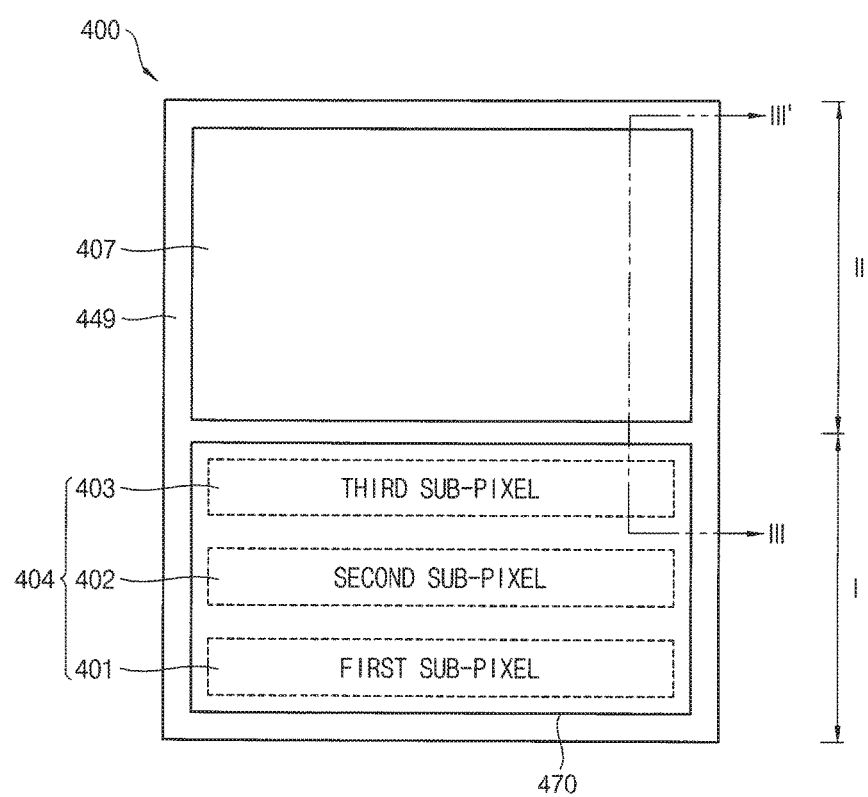
FIG. 8 is a plan view illustrating an example of a third display panel in the multi-image display device of FIG. 6.

FIG. 8 is a plan view illustrating an example of a third display panel in the multi-image display device of FIG. 6.

Referring to FIG. 8, the third display panel 400 may include a pixel region I and a transparent region II. A pixel 404 including first to third sub-pixels 401, 402, and 403 may be located in the pixel region I. A transparent window 407 may be located in the transparent region II.

In some embodiments, the first to third sub-pixels may emit a red color light, a green color light, and a blue color light, respectively. The third image may be output from the pixel region I.

In the transparent region II, the transparent window 407 may transmit external light. For example, the transparent window 407 may transmit the first superposition image to the outside the multi-image display device 2000. Here, common lines (i.e., data lines, scan lines, power supply lines, etc.) and insulating layers (i.e., a pixel defining layer, a protection layer, etc.) may be disposed in a portion (e.g., a dead space) that surrounds the first, second, and third sub-pixels 401, 402, and 403 and the transparent window 407. For example, a pixel defining layer may surround the first, second, and third sub-pixels 401, 402, and 403 and the transparent window 407.

Figure 9:
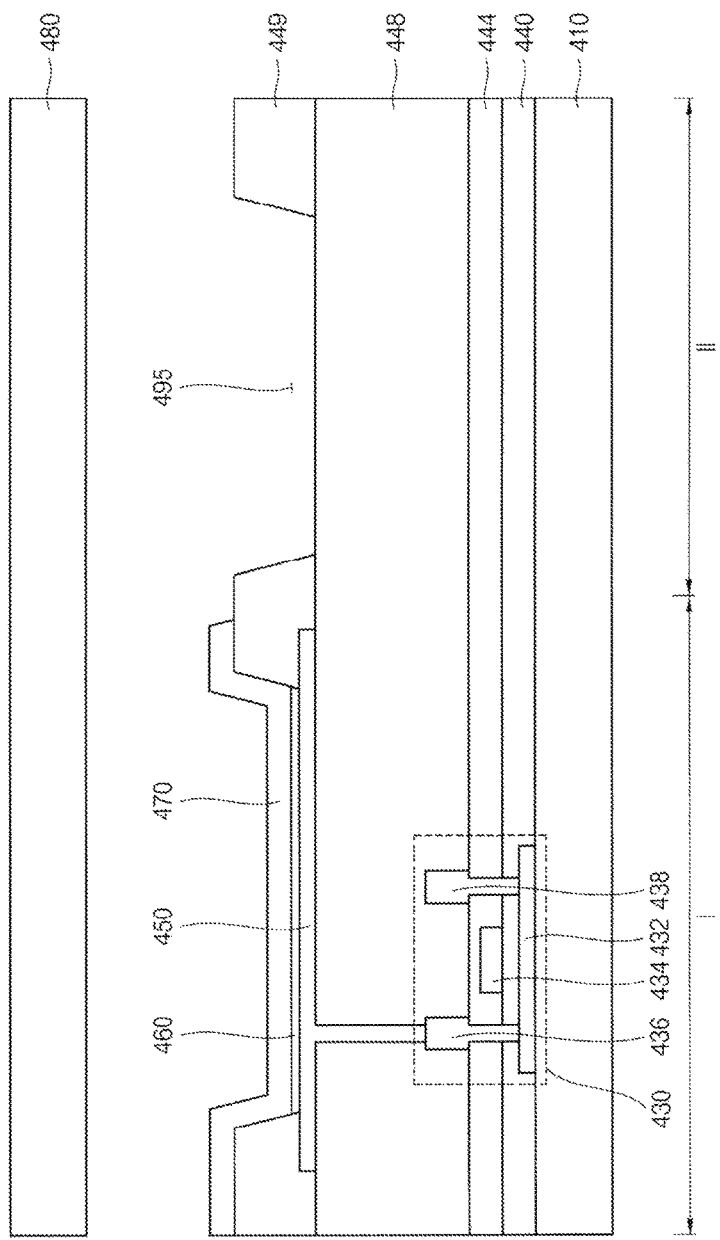
FIG. 9 is a cross-sectional view of the third display panel taken along the line of FIG. 8.

FIG. 9 is a cross-sectional view of the third display panel taken along the line of FIG. 8.

Referring to FIG. 9, the third display panel 400 may include a substrate 410, a light emitting structure, and an encapsulation layer (or a second substrate) 480.

In FIG. 9, like reference numerals are used to designate elements of the third display panel that are the same as those in FIG. 4 or FIG. 5, and detailed description of these elements may be omitted. The third display panel of FIG. 9 may be substantially the same as or similar to the second display panel of FIG. 4 or FIG. 5 except for transparent region II.

A transistor 430 and the light emitting structure including a plurality of insulation layers may be located in the pixel region I. The light emitting structure and at least one of the insulation layers may be not located in the transparent region II. In some embodiments, the insulation layer may include a gate insulation layer 440, an insulating interlayer 444, etc.

The substrate 410 may include the pixel region I and the transparent region II adjacent to the pixel region I. The substrate 410 may be a transparent ceramic substrate or a transparent resin substrate. Here, the transparent resin substrate for the substrate 410 may include a polyimide substrate. A buffer layer may be disposed on the substrate 410.

The transistor 430 may include the active pattern 432, a gate electrode 434, a source electrode 438, and a drain electrode 436. For example, the active pattern 432 may be disposed on the substrate 410. The active pattern 432 may include an oxide semiconductor, an inorganic semiconductor (e.g., amorphous silicon, polysilicon, etc.), an organic semiconductor, etc.

The gate insulation layer 440 may be disposed on the substrate 410. The gate insulation layer 440 may cover the active pattern 432. The insulating interlayer 444 may be disposed on the gate insulation layer 440 to cover the gate electrode 434. The source electrode 438 and the drain electrode 436 may be disposed on the insulating interlayer 444. An insulation layer 448 may be disposed on the insulating interlayer 444, the source electrode 438, and the drain electrode 436 to cover the transistor 430. In some embodiments, at least one of the gate insulation layer 440, the insulating interlayer 444, and the insulation layer 448 may not be disposed in the transparent region II. Thus, a light transmissivity of the transparent region II may be improved.

The light emitting structure may include a first electrode 450, a light emitting layer 460, and a second electrode 470.

The first electrode 450 may be disposed on the insulation layer 448 in the pixel region I. The first electrode 450 may be electrically coupled to (e.g., electrically connected to) the drain electrode 436 of the transistor 430 through a contact formed in the insulation layer 448.

The pixel defining layer 449 may be disposed on the insulation layer 448 to expose a portion of the first electrode 450 and a portion of the insulation layer 448. A portion of the exposed insulation layer 448 may correspond to the transparent window 495.

The light emitting layer 460 may be disposed on the exposed first electrode 450. The second electrode 470 may be disposed on the light emitting layer 460 and the pixel defining layer 449. The second electrode 470 may serve as a common electrode shared by adjacent pixels.

The encapsulation layer 480 may be disposed over the second electrode 470, the pixel defining layer 449, and the transparent window 495. The encapsulation layer 480 may include material substantially the same as or similar to those of the substrate 410. For example, the second substrate 480 may include a flexible transparent resin. The encapsulation layer 480 may include a stacked structure in which at least one organic layer and at least one inorganic layer are alternately (or repeatedly) stacked.

Accordingly, the third display panel 400 may include the transparent region II so as to serve as the transparent display panel.

Figure 10:
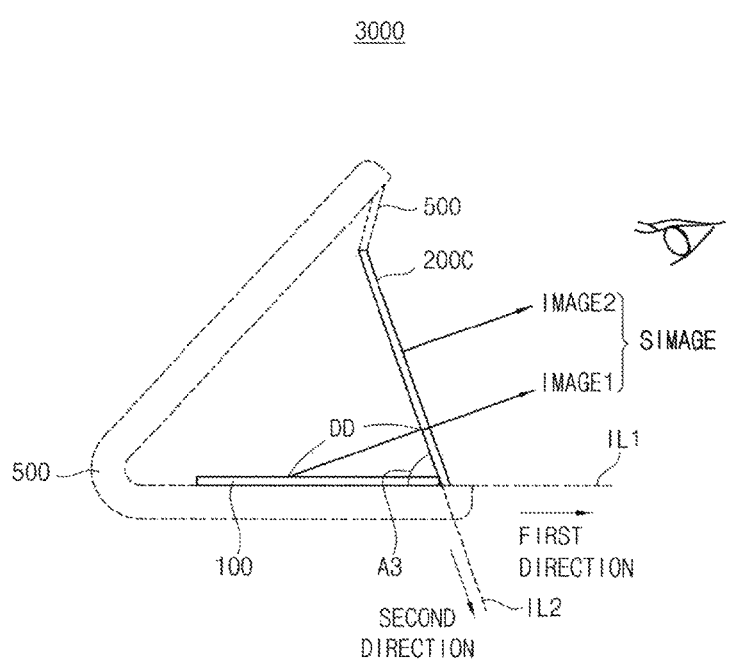
FIG. 10 is a diagram of a multi-image display device according to example embodiments.
Figure 11:
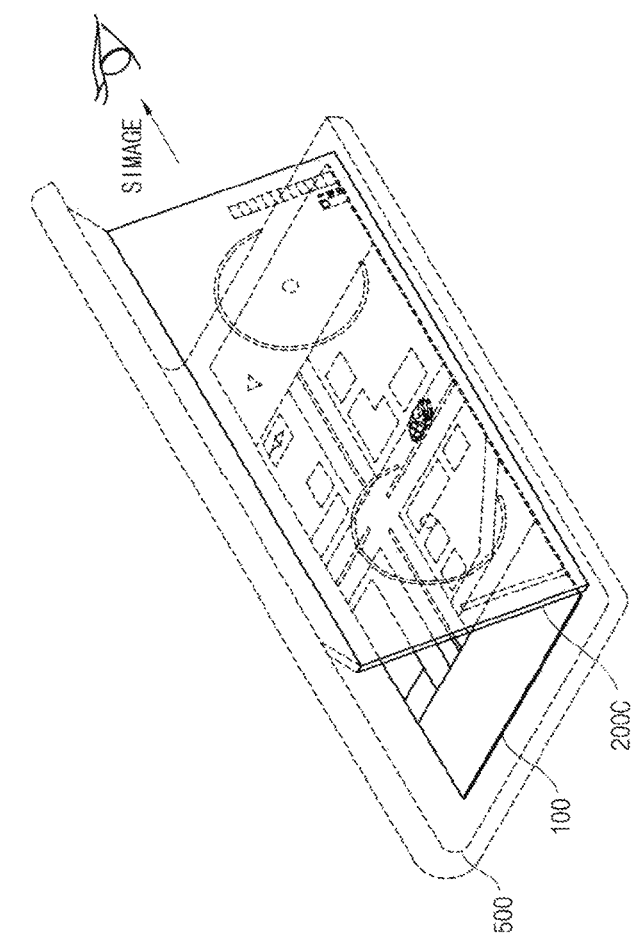
FIG. 11 is a perspective view illustrating an example of the multi-image display device of FIG. 10.

FIG. 10 is a diagram of a multi-image display device according to example embodiments. FIG. 11 is a perspective view illustrating an example of the multi-image display device of FIG. 10.

Referring to FIGS. 10 and 11, the multi-image display device 3000 may include a first display panel 100 and the second display panel 200C. The multi-image display device 3000 may further include a joint member 500 mechanically connected between the first display panel 100 and the second display panel 200C.

The first display panel 100 may output a first image IMAGE1. The first display panel may correspond to a flat display panel including a plurality of pixels. For example, the first display panel 100 may be a liquid crystal display panel including a liquid crystal layer or an organic light emitting display panel including a plurality of organic light emitting diodes.

The second display panel 200C may output a second image IMAGE2. The second display panel 200C may be located on a second extension line IL2 inclined at a first angle A3 with respect to a first extension line ILL which is an imaginary line extended from the first display panel 100 along a horizontal direction of the first display panel 100. The second display panel 200C may transmit the first image IMAGE1 to display a superposition image SIMAGE in which the second image IMAGE2 is superimposed on the first image IMAGE1. The first angle A3 may be an acute angle less than 90°. Thus, the second display panel 200C may transmit the entire first image IMAGE1. Accordingly, the user may watch the first image IMAGE1 and the second image IMAGE2 through the second display panel 200C. In some embodiments, the superposition image may be represented as a stereoscopic image. For example, a depth of the transmitted first image IMAGE1 may be deeper than a depth of the second image (e.g., indicated as DD in FIG. 10) by a transmission of the second display panel such that the user may see the superposition image SIMAGE as the stereoscopic image. For example, the second image IMAGE2 output from the second display panel 200C may correspond to an object image, and the first image IMAGE1 output from the first display panel 100 may correspond to the background image for the object image. The second display panel 200C may transmit the first image IMAGE1 such that the first image IMAGE1 appears to be behind the second image IMAGE2.

In some embodiments, the second display panel 200C may correspond to a transparent display panel. For example, the second display panel 200C may correspond to the transparent display panel of FIGS. 8 and 9.

In some embodiments, the multi-image display device 3000 may further include a support member and/or the joint member 500 to support and connect the first display panel 100 and the second display panel 200. For example, the joint member 500 may connect a side of the first display panel 100 to a side of the second display panel 200C. In some embodiments, the joint member 500 may adjust the first angle A3.

In some embodiments, the first display panel 100 and the second display panel 200C may be formed in an integral form. For example, the multi-image display device 3000 may have a flexible or bent substrate (or display panel) including first and second area. The first area may include pixel regions for outputting the first image IMAGE1. The second area may include pixel regions for outputting the second image IMAGE2 and transparent regions for transmitting the first image IMAGE1.

As described above, the multi-image display device 3000 may include the second display panels 200C as the transparent display panel such that first and second images IMAGE1 and IMAGE2 are superimposed. Thus, the user may perceive the superposition image SIMAGE as the stereoscopic image due to the depth difference DD between the first image IMAGE1 and the second image IMAGE2. Therefore, the multi-image display device 3000 may provide stereoscopic visual effects to the users using the mirror display panel 200C.

The present embodiments may be applied to any display device and any system including the display device. For example, the present embodiments may be applied to vehicle-display device, a ship-display device, an aircraft-display device, portable communication devices, display devices for display or for information transfer, a medical-display device, etc.

The foregoing is illustrative of example embodiments and is not to be construed as limiting thereof. Although a few example embodiments have been described, those skilled in the art would readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A multi-image display device comprising:
a first display panel configured to output a first image; and
a second display panel configured to output a second image and located on a second extension line inclined at a first angle with respect to a first extension line such that an entirety of the second display panel is configured to be inclined at an acute angle with respect to the first extension line, wherein the first extension line is an imaginary line extended from the first display panel along a horizontal direction of the first display panel,
wherein the second display panel reflects the first image to display a first superposition image in which the second image is superimposed on the first image,
wherein the second display panel is formed as a single piece, and includes:

a substrate including a pixel region, a reflective region, and a peripheral region;
a light emitting structure on the pixel region of the substrate;
at least one blocking structure on the peripheral region of the substrate;
a first inorganic layer to cover the light emitting structure and the at least one blocking structure;
a first organic layer on the pixel region and the reflective region of the first inorganic layer;
a second inorganic layer on the first inorganic layer and the first organic layer;
a reflective member on the reflective region of the second inorganic layer;
a second organic layer on the second inorganic layer to cover the reflective member; and
a third inorganic layer on the second inorganic layer and the second organic layer.

2. The display device of claim 1, wherein a depth of the reflected first image is deeper than a depth of the second image by a reflection of the second display panel such that the first superposition image is represented as a stereoscopic image.

3. The display device of claim 2, wherein the second display panel reflects the first image to be a background image with respect to the second image.

4. The display device of claim 2, wherein the first display panel corresponds to a flat display panel and the second display panel corresponds to a mirror display panel.

5. The display device of claim 4, wherein the first display panel and the second display panel are formed in an integral form.

6. The display device of claim 1, wherein the second display panel includes:
a first substrate including a pixel region and a reflective region surrounding the pixel region;
a light emitting structure in the pixel region, the light emitting structure being on the first substrate;
a second substrate facing the first substrate; and
a reflective member on a lower surface of the second substrate corresponding to the reflective region.

7. The display device of claim 6, wherein the light emitting structure includes:
a transistor on the first substrate;
a first electrode on the transistor, the first electrode being connected to the transistor;
a pixel defining layer exposing at least a portion of the first electrode;
a light emitting layer on the exposed first electrode; and
a second electrode on the light emitting layer.

8. The display device of claim 1, further comprising:
a joint unit mechanically connected between the first display panel and the second display panel to adjust the first angle.

9. The display device of claim 1, further comprising:
a third display panel located on a third extension line inclined at a second angle with respect to the first extension line and configured to output a third image,
wherein the third display panel transmits the first superposition image to display a second superposition image in which the third image is superimposed on the first superposition image.

10. The display device of claim 9, wherein a depth of the transmitted first superposition image is deeper than a depth of the third image by a transmission of the first superposition image such that the second superposition image is represented as a stereoscopic image.

11. The display device of claim 10, wherein the first display panel corresponds to a flat display panel, the second display panel corresponds to a mirror display panel, and the third display panel corresponds to a transparent display panel.

12. The display device of claim 10, wherein the third display panel includes:
a substrate including a pixel region and a transparent region adjacent to the pixel region; and
a light emitting structure on the pixel region of the substrate, the light emitting structure including a plurality of insulation layers, wherein the light emitting structure is not located in the transparent region.

13. A multi-image display device comprising:
a first display panel configured to output a first image; and
a second display panel configured to output a second image and located on a second extension line inclined at a first angle with respect to a first extension line such that an entirety of the second display panel is configured to be inclined at an acute angle with respect to the first extension line, wherein the first extension line is an imaginary line extended from the first display panel along a horizontal direction of the first display panel,
wherein the second display panel transmits the first image to display a superposition image in which the second image is superimposed on the first image
wherein the second display panel is formed as a single piece, and includes:
a substrate including a pixel region, a reflective region, and a peripheral region;
a light emitting structure on the pixel region of the substrate;
at least one blocking structure on the peripheral region of the substrate;
a first inorganic layer to cover the light emitting structure and the at least one blocking structure;
a first organic layer on the pixel region and the reflective region of the first inorganic layer;
a second inorganic layer on the first inorganic layer and the first organic layer;
a reflective member on the reflective region of the second inorganic layer;
a second organic layer on the second inorganic layer to cover the reflective member; and
a third inorganic layer on the second inorganic layer and the second organic layer.

14. The display device of claim 13, wherein a depth of the transmitted first image is deeper than a depth of the second image by a transmission of the second display panel such that the superposition image is represented as a stereoscopic image.

15. The display device of claim 14, wherein the second display panel transmits the first image to be a background image with respect to the second image.

16. The display device of claim 14, wherein the first display panel corresponds to a flat display panel and the second display panel corresponds to a transparent display panel.

17. The display device of claim 16, wherein the second display panel includes:
a substrate including a pixel region and a transparent region adjacent to the pixel region; and
a light emitting structure on the pixel region of the substrate, the light emitting structure including a plurality of insulation layers,
wherein the light emitting structure is not located in the transparent region.

18. The display device of claim 16, wherein the first display panel and the second display panel are formed in an integral form.

19. The display device of claim 14, further comprising:
a joint unit mechanically connected between the first display panel and the second display panel to adjust the first angle.

* * * * *